United States Patent
Mitsuyasu

(10) Patent No.: US 9,381,920 B2
(45) Date of Patent: Jul. 5, 2016

(54) VEHICLE CONTROL SYSTEM

(75) Inventor: Masaki Mitsuyasu, Kawasaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 42 days.

(21) Appl. No.: 14/410,852

(22) PCT Filed: Jun. 27, 2012

(86) PCT No.: PCT/JP2012/066342
§ 371 (c)(1),
(2), (4) Date: Dec. 23, 2014

(87) PCT Pub. No.: WO2014/002206
PCT Pub. Date: Jan. 3, 2014

(65) Prior Publication Data
US 2015/0203118 A1    Jul. 23, 2015

(51) Int. Cl.
*B60W 10/02* (2006.01)
*B60W 10/06* (2006.01)
*B60W 30/18* (2012.01)
*F16D 48/02* (2006.01)
(Continued)

(52) U.S. Cl.
CPC ......... *B60W 30/18072* (2013.01); *B60W 10/02* (2013.01); *B60W 10/06* (2013.01); *F02D 17/02* (2013.01); *F02D 41/0087* (2013.01); *F02D 41/022* (2013.01); *F02D 41/08* (2013.01); *F02D 41/12* (2013.01); *F16D 48/02* (2013.01); *F16D 48/062* (2013.01); *B60W 2030/1809* (2013.01); *B60W 2510/0638* (2013.01); *B60W 2520/10* (2013.01); *B60W 2540/10* (2013.01); *B60W 2710/065* (2013.01); *F02D 2200/101* (2013.01); *F02D 2200/501* (2013.01); *F02D 2200/602* (2013.01); *F16D 2500/10412* (2013.01); *F16D 2500/3067* (2013.01); *F16D 2500/30401* (2013.01); *F16D 2500/3108* (2013.01); *F16D 2500/3144* (2013.01); *F16D 2500/3166* (2013.01); *F16D 2500/5043* (2013.01);
(Continued)

(58) Field of Classification Search
None
See application file for complete search history.

(56) References Cited

U.S. PATENT DOCUMENTS

| 2002/0116099 A1 | 8/2002 | Tabata et al. |
| 2004/0102286 A1 | 5/2004 | Tabata et al. |

(Continued)

FOREIGN PATENT DOCUMENTS

| JP | 59-060049 | 4/1984 |
| JP | H08-105334 A | 4/1996 |

(Continued)

*Primary Examiner* — Edwin A Young
(74) *Attorney, Agent, or Firm* — Kenyon & Kenyon LLP

(57) ABSTRACT

A vehicle control system is provided. The vehicle control system is applied to a vehicle comprising an engine having cylinders, a power transmission route between the engine and drive wheels, and a clutch selectively connecting and disconnecting the power transmission route. The vehicle control system disconnects the power transmission route during running to allow the vehicle to coast. The vehicle control system is comprised of: a means that detects a vehicle speed; a means that detects an operation of an accelerator by a driver; a means that detects a speed of the engine; an execution means that executes a coasting control when an operating amount of an accelerator is reduced to be smaller than a predetermined value during running, by bringing the clutch device into disengagement to disconnect the power transmission route; and an engine control means that reduces number of combusting cylinders during the coasting control while reducing the engine speed to an idling speed that is lower than that of a case in which the coasting control is not carried out.

4 Claims, 5 Drawing Sheets

(51) Int. Cl.
*F02D 41/00* (2006.01)
*F02D 41/02* (2006.01)
*F02D 41/08* (2006.01)
*F02D 41/12* (2006.01)
*F02D 17/02* (2006.01)
*F16D 48/06* (2006.01)

(52) U.S. Cl.
CPC . *F16D2500/5045* (2013.01); *F16D 2500/5085* (2013.01); *F16D 2500/50227* (2013.01); *F16D 2500/7041* (2013.01)

(56) References Cited

U.S. PATENT DOCUMENTS

| | | |
|---|---|---|
| 2004/0158365 A1 | 8/2004 | Tabata et al. |
| 2005/0143898 A1 | 6/2005 | Kaneko et al. |
| 2007/0272212 A1 | 11/2007 | Aoki et al. |
| 2009/0133946 A1* | 5/2009 | Pels ................ B60K 6/46 180/65.275 |
| 2012/0088629 A1* | 4/2012 | Aoyama ............ B60W 10/02 477/39 |
| 2012/0135841 A1* | 5/2012 | Watanabe ......... B60W 10/026 477/115 |

FOREIGN PATENT DOCUMENTS

| | | |
|---|---|---|
| JP | 2002-089307 A | 3/2002 |
| JP | 2005-140076 A | 6/2005 |
| JP | 2005-188423 A | 7/2005 |
| JP | 2005-188432 A | 7/2005 |
| JP | 2011-007139 A | 1/2011 |
| JP | 2011-163535 A | 8/2011 |

* cited by examiner

VEHICLE CONTROL SYSTEM

CROSS-REFERENCE TO RELATED APPLICATION

This is a national phase application based on the PCT International Patent Application No. PCT/JP2012/066342 filed Jun. 27, 2012, the entire contents of which are incorporated herein by reference.

TECHNICAL FIELD

The present invention relates to a control system for a vehicle that is provided with a clutch device for selectively connect and disconnect a prime mover to/from drive wheels through a power transmission route, and that is allowed to coast by bringing the clutch device into disengagement.

BACKGROUND ART

In order to improve fuel economy, a fuel cut-off control for stopping fuel supply to an engine during running, and a coasting control for coasting the vehicle by disconnecting the engine from a drive line during running have been employed in recent years. Specifically, the fuel cut-off is carried out to stop fuel supply to the engine given that an accelerator is returned to close an accelerator valve completely, and that an engine speed is higher than an idling speed so that a vehicle speed is higher than a predetermined speed. Under the fuel cut-off control, although the combustion of fuel in the engine is stopped, the engine is still rotating by a torque from the drive wheels. Therefore, a braking torque resulting from a pumping loss of the engine and a friction torque is applied to the drive wheels. Consequently, an engine braking force is applied to the vehicle.

For example, the coasting control is carried out when the accelerator is returned during running to coast the vehicle without rotating the engine passively by bringing the clutch into disengagement disposed between the engine and the drive wheels. Therefore, under the coasting control, the engine braking force will not be applied to the vehicle so that the vehicle is allowed to coast utilizing an inertia energy.

The coasting control may be carried out not only by stopping the fuel supply to the engine but also without stopping the fuel supply to the engine while lowering the engine speed close to the idling speed. In case of carrying out the coasting control while stopping the engine, the fuel will not be consumed during coasting the vehicle so that the fuel economy can be improved significantly. By contrast, in case of carrying out the coasting control without stopping the engine, the fuel economy will not be improved as the case of stopping the engine. In this case, however, it is not necessary to arrange additional devices for insuring a required oil pressure under cessation of the engine such as an electric oil pump, a hydraulic accumulator etc. Therefore, the coasting control can be carried out easily without requiring additional modification of the vehicle and additional equipment. In the following explanation, the coasting control without stopping the engine will be called the "neutral coasting control" or the "N coasting control".

For example, Japanese Patent Laid-Open No. 2011-163535 describes a controller for mechanical automatic transmission configured to carry out the coasting control. According to the teachings of Japanese Patent Laid-Open No. 2011-163535, an input shaft of a geared transmission is connected to an output shaft of an engine though a friction clutch, and an alteration of engagement state of the clutch and a speed change operation of the transmission are carried out automatically. To this end, a coasting of the vehicle is determined based on a vehicle speed, an execution of a speed change of the transmission, and an accelerator opening. Given that the coasting of the vehicle is continued for a predetermined period of time, the clutch is brought into disengagement and the vehicle speed is lowered to an idling speed. In case the vehicle is not coasting after disengaging the clutch, a target gear stage of the transmission is established according to the vehicle speed and the accelerator opening, and then the clutch is brought into engagement.

Japanese Patent Laid-Open No. 2011-7139 describes a cooling device for a multi-cylinder engine. According to the teachings of Japanese Patent Laid-Open No. 2011-7139, the multi-cylinder engine is allowed to be started while reducing number of activated cylinders when started under cold condition. Such reduced cylinder operation control is continued during idling of the engine.

Japanese Patent Laid-Open No. 2005-188432 describes a control device applied to a multi-cylinder engine comprising a plurality of cylinders, an electronic fuel infector injecting fuel the cylinders, an electronic valve activating mechanism opening and closing an intake valve and an exhaust valve of each cylinder. According to the teachings of Japanese Patent Laid-Open No. 2005-188432, the control device stops fuel injection to some cylinders while closing the intake and exhaust valves thereof, upon expiration of preset time while the engine is idled in the vehicle waiting for a traffic light.

Japanese Patent Laid-Open No. 2005-140076 describes a control device for a vehicle having an automatic transmission provided with a torque convertor having a lockup clutch. According to the teachings of Japanese Patent Laid-Open No. 2005-140076, a fuel cut-off is carried out to stop fuel supply to the engine upon satisfaction of a predetermined condition. If the lockup clutch is in engagement or causing a slip, a timing to commence the fuel cut-off is hastened to be earlier than that of the case in which the lockup clutch is in disengagement. In addition, Japanese Patent Laid-Open No. 2005-140076 describes a control to sequentially stop the fuel supply to the cylinders of the engine after a predetermined delay time from a point at which the lockup clutch has been brought into disengagement.

Japanese Patent Laid-Open No. 8-105334 discloses a control device for a variable displacement engine in which intake valves and exhaust valves of deactivated cylinders are closed within a low load operating range. According to the teachings of Japanese Patent Laid-Open No. 8-105334, displacement mode in which some of the cylinders are deactivated is selected based on a shift position and an engine operating range. Basically, the cylinder deactivation mode is selected upon shifting of the shift position to a neutral position. After shifting the shift position from the drive position to the neutral position, the cylinders activated under the drive position are continuously activated within a predetermined period of time from the point at which the shift position was shifted. In addition, according to the teachings Japanese Patent Laid-Open No. 8-105334, such cylinder deactivation is carried out after raising the idling speed of the engine to prevent an engine stall and to reduce vibrations.

As described, according to the teachings of Japanese Patent Laid-Open No. 2011-163535, the friction clutch is brought into disengagement during the coasting of vehicle so that the vehicle is allowed to be propelled by inertia force, and the engine speed is lowered to the idling speed. That is, the neutral coasting control is carried out to disconnect the engine from the transmission line to idle for improved fuel economy. The engine is operated at the idling speed even under the neutral coasting so that an oil pump or other auxiliary mechanism can be driven by the engine. For this reason, the neutral coasting control taught by Japanese Patent Laid-Open No. 2011-163535 may be adapted for the conventional vehicles. However, the engine is kept driven under during the neutral coasting control although not involved in propulsion of the vehicle. Consequently, more fuel is consumed in comparison with the neutral coasting while stopping the engine. Thus, the coasting neutral control has to be improved to improve fuel economy.

DISCLOSURE OF THE INVENTION

The present invention has been conceived noting the foregoing technical problems, and it is therefore an object of the present invention is to provide a vehicle control system configured to carry out the neutral coasting control in an optimally fuel efficient manner while interrupting a power transmission between an engine and drive wheels and idling the engine.

The vehicle control system of the present invention is applied to a vehicle comprising an engine having a plurality of cylinders, a power transmission route between the engine and drive wheels and a clutch device adapted to selectively connect and disconnect a power transmission route, and vehicle control system is configured to disconnect the power transmission route during running to allow the vehicle to coast. In order to achieve the above-explained objectives, according to the present invention, the vehicle control system is provided with: a means that detects a vehicle speed; a means that detects an operation of an accelerator by a driver; a means that detects a speed of the engine; an execution means that executes a coasting control when an operating amount of an accelerator is reduced to be smaller than a predetermined value during running, by bringing the clutch device into disengagement to disconnect the power transmission route; and an engine control means that reduces number of combusting cylinders during the coasting control while reducing the engine speed to an idling speed that is lower than that of a case in which the coasting control is not carried out.

The engine control means is configured to adjust the idling speed to be higher than a lower limit speed at which the engine operated under all-cylinder mode is allowed to rotate autonomously.

The engine control means is further configured to reduce number of combusting cylinders after a lapse of a predetermined period of time from a point at which the clutch device is brought into disengagement.

Thus, according to the present invention, the neutral coasting of the vehicle is carried out upon reduction in operation of the accelerator to be smaller than the predetermined value during running. Specifically, the neutral coasting is achieved by disengaging the clutch device to disconnect the power transmission route between the engine and the drive wheels, while reducing the engine speed to the idling speed. Therefore, a cruising distance of the vehicle can be extended so that fuel economy can be improved.

In addition to operating the engine at the idling speed, during the neutral coasting, the cylinder deactivation is carried out to reduce number of the combusting cylinders. For example, given that the engine 1 is a four-cylinder engine, two cylinders are deactivated. Consequently, fuel consumption can be reduced during the neutral coasting control of the present invention, in comparison with the conventional coasting control while activating all cylinders. For this reason, the fuel economy can be further improved during the neutral coasting control.

According to the present invention, under the cylinder deactivation mode during the neutral coasting, the engine speed is lowered to the idling speed that is higher than a lower limit speed at which the engine operated under all-cylinder mode is allowed to rotate autonomously. That is, the idling speed of the engine is raised to be higher than that under the all-cylinder mode. Under the cylinder deactivation mode, vibrations of the engine are amplified and such vibrations are increased especially at the lower limit speed. According to the present invention, however, the idling speed of the engine under the cylinder deactivation mode is raised to be higher than that under the normal running so that the vibrations of the engine can be suppressed.

In addition, according to the present invention, the cylinder deactivation of the engine is carried out after a lapse of the predetermined period of time from a point at which the clutch device is brought into disengagement. For this reason, torque pulses and vibrations resulting from commencing the cylinder deactivation will not propagate to the drive wheels through the power transmission route.

DESCRIPTION OF THE PREFERRED EMBODIMENT(S)

Figure 1:
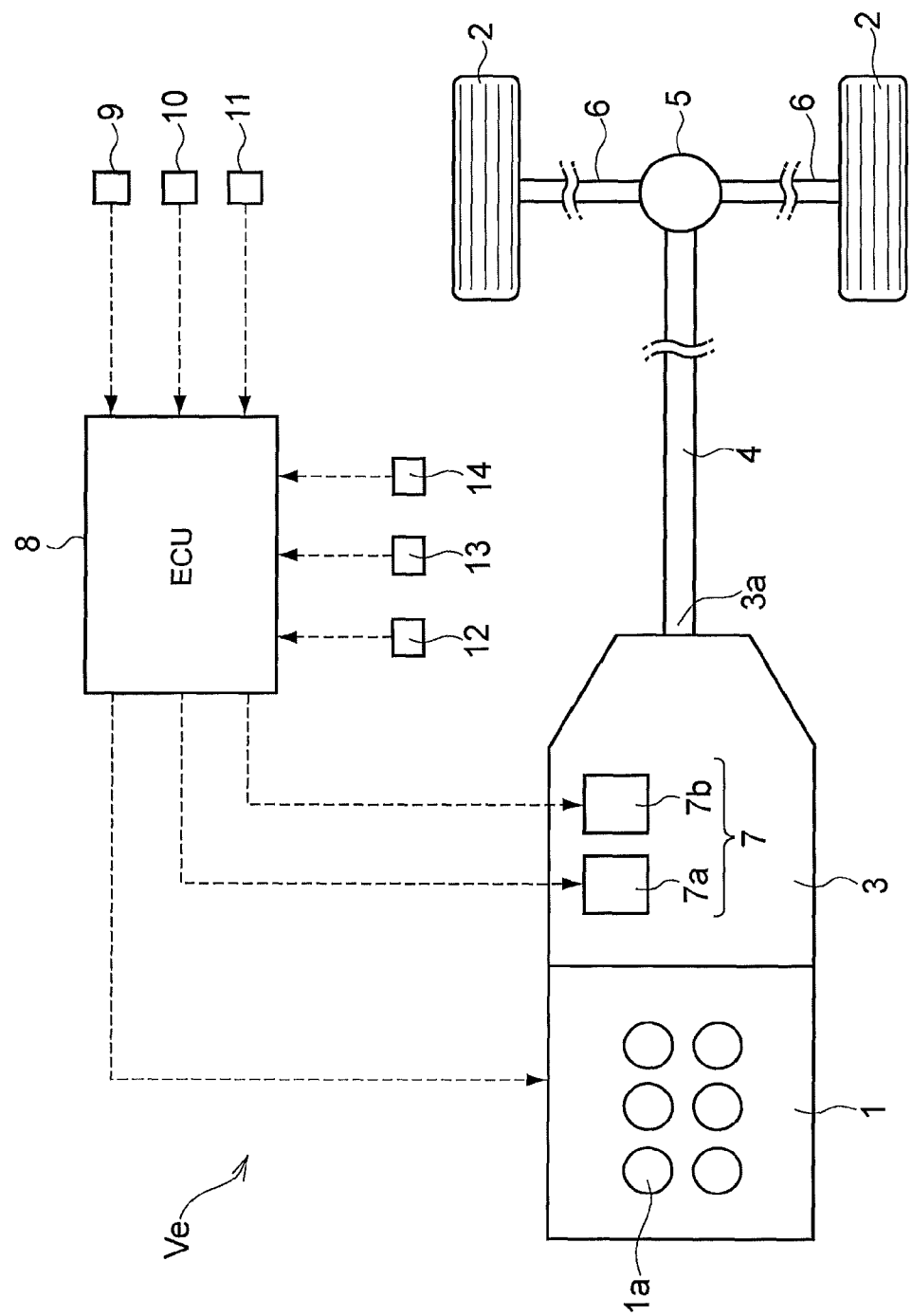
FIG. 1 is a view schematically showing an example of a drive line and a control line of the vehicle to which the control system of the present invention is applied.

Next, the present invention will be explained in more detail with reference to the accompanying drawings. FIG. 1 shows a drive line and a control line of the vehicle to which the control system of the present invention is applied. As shown in FIG. 1, the vehicle Ve is comprised of an engine 1, and an automatic transmission 3 connected to an output side of the engine 1 to transmit a power of the engine 1 to drive wheels 2. Specifically, the automatic transmission 3 is disposed on the output side of the engine 1, and an output shaft 3a of the automatic transmission 3 is connected to the drive wheels 2 to transmit power therebetween through a propeller shaft 4, a differential gear 5 and a drive shaft 6. Thus, FIG. 1 shows an example of rear-drive layout of the vehicle Ve in which the engine 1 is connected to the rear drive wheels 2 through the propeller shaft 4. However, the control system of the present invention may also be applied to a front drive vehicle and a four-wheel drive vehicle.

The engine 1 serves as a prime mover of the vehicle Ve, and for example, an internal combustion engine for generating power by burning fuel such as a gasoline engine, a diesel engine a natural gas engine and etc. may be used. According to the example shown in FIG. 1, the gasoline engine is used as the engine 1, and the engine 1 is comprised of an electronic throttle valve an opening degree thereof is controlled electrically, and a fuel injector an injecting amount thereof is controlled electrically. Therefore, the engine 1 can be operated in an optimally fuel efficient manner by electrically controlling a rotational speed with respect to a predetermined load.

The engine 1 is comprised of a plurality of cylinders 1a in which a piston is reciprocated by burning fuel. An operation mode of the engine 1 can be selected depending on a situation from an all-cylinder mode where all cylinders 1a are activated and a cylinder deactivation mode where some of the cylinders 1a are deactivated.

The automatic transmission 3 is adapted to transmit a torque of the engine 1 to the drive wheels 2 while carrying out a speed change. For example, a geared automatic transmission (AT), a belt-driven or toroidal continuously variable transmission (CVT), a dual-clutch automatic transmission (DCT) based on a geared manual transmission, an automatic clutch manual transmission (AMT) and so on may be used as the automatic transmission 3. The vehicle Ve is further provided with a clutch device 7 adapted to selectively allow a power transmission between the engine 1 and the drive wheels 2, irrespective of a type of the automatic transmission 3, and irrespective of a drive system such as a front drive system, a rear drive system and a four wheel drive system.

According to the example shown in FIG. 1, a geared automatic transmission having a planetary gear unit is employed as the automatic transmission 3. As the conventional AT, the automatic transmission 3 is comprised of a plurality of planetary gear units (not shown), a forward clutch 7a engaged to establish a forward stage, and a reverse brake 7b engaged to establish a reverse stage. Optionally, the automatic transmission 3 may be provided with an additional clutch or brake to be engaged to establish a predetermined forward stage. Accordingly, the automatic transmission 3 is brought into a neutral stage by disengaging both of the forward clutch 7a and the reverse brake 7b. As a result of thus disengaging the forward clutch 7a and the reverse brake 7b, the engine 1 is disconnected from the drive wheels 2 so that the power transmission therebetween is interrupted. Accordingly, in the example shown in FIG. 1, the clutch device 7 comprised of the forward clutch 7a and the reverse brake 7b serves as the clutch device of the invention.

As described, the CVT may be used as the automatic transmission 3. The conventional CVT is comprised of a belt driven transmission and a torque reversing device for reversing a direction of the torque transmitted to the drive wheels 2 between the forward direction and the backward direction. Specifically, the torque reversing device is comprised of a forward clutch engaged to establish the forward stage and a reverse clutch engaged to establish the reverse stage. Therefore, the power transmission between the engine 1 and the automatic transmission 3 is interrupted by disengaging both of the forward clutch and the reverse brake. That is, a neutral stage of the automatic transmission 3 is established. In this case, the forward clutch and the reverse brake serve as the clutch device of the invention.

Given that the DCT is used as the automatic transmission 3, the power transmission between the engine 1 and the automatic transmission 3 is interrupted by disengaging both of the clutches of the DCT. That is, a neutral stage of the automatic transmission 3 is established. In this case, the two clutches of the DCT serve as the clutch device of the invention.

Given that the AMT is used as the automatic transmission 3, the power transmission between the engine 1 and the automatic transmission 3 is interrupted by disengaging a clutch of the conventional manual transmission device and the engine 1. That is, a neutral stage of the automatic transmission 3 is established. In this case, the above-explained clutch serves as the clutch device of the invention.

The control system of the present invention may be applied not only to a hybrid vehicle in which the prime mover is comprised of an internal combustion engine and an electric motor, but also to an electric vehicle in which only the electric motor is used as the prime mover. In order to selectively connect and disconnect the power transmission route between the prime mover and the drive wheels 2, according to the present invention, the vehicle Ve is provided with the clutch device 7 irrespective of a kind of the prime mover such as the engine 1, the electric motor, and a hybrid drive unit comprised of the engine 1 and the electric motor. For example, a friction clutch and a dog clutch may be used as the clutch device 7, and in case of using the friction clutch, any of a wet type and a dry type friction clutches may be used. That is, any kinds of clutch devices may be used as the clutch device 7 to selectively allow and interrupt a power transmission route between the prime mover such as the engine 1, the electric motor, and a hybrid drive unit and the drive wheels 2 to transmit power therebetween.

Given that the vehicle Ve is the hybrid vehicle or the electric vehicle having the electric motor as the prime mover, a braking force can be applied to the vehicle Ve by carrying out a regeneration control of the electric motor while engaging the clutch device 7. Specifically, a braking torque can be applied to the drive wheels 2 to decelerate the vehicle Ve during running by operating the electric motor as a generator while engaging the clutch device 7.

In order to control an operating condition of the engine 1 and engagement state of the clutch device 7, the vehicle Ve is provided with an electronic control unit (ECU) 8 as a controller that is configured to carry out a calculation based on input data and preinstalled data, and to output a calculation result in the form of a command signal. For example, detection signals from a wheel speed sensor 9 adapted to detect a rotational speed of each wheel of the vehicle Ve, an accelerator sensor 10 adapted to detect a depressing angle or a depressing amount of an accelerator pedal, a brake sensor 11 adapted to detect a depressing angle or a depressing amount of a brake pedal, an engine speed sensor 12 adapted to detect a speed of the engine 1, a throttle sensor 13 detecting the opening degree of the throttle valve of the engine 1, an inclination sensor 14 adapted to detect an inclination angle of the vehicle Ve and so on are sent to the electronic control unit 8. Based on those signals, the electronic control unit 8 sends a command signals to the engine 1 to control the operating condition, and to the clutch device 7 to control the engagement state.

Given that the electric motor is used as the prime mover of the vehicle Ve, a detection signal from a speed sensor for the electric motor or a resolver is additionally sent to the electronic control unit 8. In this case, the electronic control unit 8 sends a command signal to the electric motor to control the operating condition.

In order to improve fuel economy of the vehicle Ve thus structured, the control system of the present invention carries out the coasting control of the vehicle Ve by bringing the clutch device 7 into disengagement during running. According to the present invention, specifically, the coasting control is carried out to cutoff a power transmission route between the engine 1 and the drive wheel 2 by disengaging the clutch device 7, under a condition that the accelerator pedal is not depressed or reduced to be smaller than the predetermined value, in other words, completely returned while the vehicle Ve is moving at a speed higher than a predetermined speed. Under the neutral coasting control, however, the engine 1 will not be stopped. That is, under the neutral coasting control, although the speed of the engine 1 is lowered almost to an idling speed, the fuel combustion is carried on.

Thus, under the neutral coasting control, a power transmission between the engine 1 and the drive wheel 2 is interrupted. Consequently, a braking torque resulting from a pumping loss of the engine 1 and a drag torque will not be applied to the drive wheels 2 of the vehicle Ve. In other words, an engine braking force will not be applied to the vehicle Ve. Therefore, under the coasting, a possible coasting distance achieved by an inertia energy of the vehicle Ve is extended. Consequently, a cruising distance of the vehicle Ve per unit of fuel can be extended so that the fuel economy of the vehicle Ve can be improved.

Under the neutral coasting control, the fuel economy of the vehicle Ve can be further improved if the fuel combustion of the engine 1 is stopped while disengaging the clutch device 7. However, if the fuel combustion of the engine 1 is stopped, a power for actuating auxiliaries such as an oil pump and a compressor for an air conditioner, and a power for actuating a hydraulic power steering system and a brake system will be lost. In this case, therefore, a substitute power source (e.g., an electric motor) and a hydraulic accumulator are required for the case of cessation of the engine 1. By contrast, given that the engine 1 is not stopped under the neutral coasting control, the power for driving those auxiliaries and the power steering and the brake systems will not be lost. In this case, therefore, the neutral coasting control can be carried out easily in the conventional vehicles without requiring the additional power source.

Thus, the neutral coasting control may be adapted easily to a conventional vehicle by thus keep operating the engine 1 in comparison with the case of stopping the engine 1. However, such fuel consumption during the neutral coasting may decrease fuel economy in comparison with the neutral coasting while stopping the engine 1. In order to improve fuel economy of the vehicle Ve, the control system of the present invention is configured to carry out the cylinder deactivation of the engine 1 during the neutral coasting control to reduce fuel consumption. A preferred control example is shown in FIG. 2, and the routine shown therein is commenced upon satisfaction of predetermined conditions and repeated at predetermined intervals.

Specifically, the conditions for commencing the coasting control includes: a fact that the vehicle Ve runs at a speed higher than a predetermined speed; a fact that the vehicle Ve runs on a road where a road grade falls within a predetermined range; and a fact that the engine 1 is combusted. That is, the predetermined speed is a reference value of the vehicle speed used to determine to execute the neutral coasting control, and to this end, a threshold value of the vehicle speed is set to a value possible to judge a speed range where the coasting control is effective, based on a simulation result or an experiment. Specifically, given that the vehicle Ve has a torque converter, the threshold value is set e.g., to 15 to 20 km/h that is a speed of the vehicle Ve creeping on a flat road while idling the engine 1. In turn, the predetermined range of the road grade is a reference range to determine if the road is a flat road where the gradient is 0%, or if an upgrade or a downgrade will not affect a running load and ignorable. To this end, such range of the road grade is determined based on a simulation result or an experiment, and may be altered in accordance with the vehicle speed. For example, the range of the road grade is set to ±2% within the speed range lower than 40 km/h, and set to ±4% within the speed range higher than 40 km/h.

Figure 2:
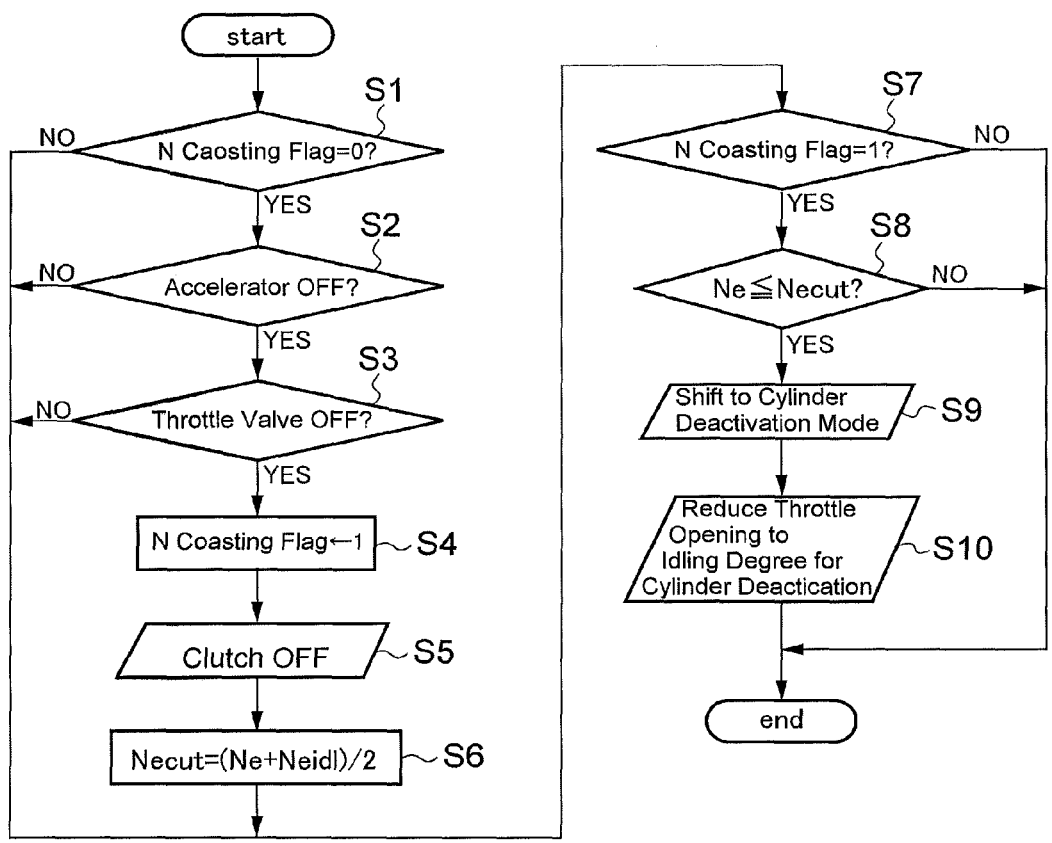
FIG. 2 is a flowchart showing one example of the neutral coasting control carried out by the control system of the present invention.

According to the control example shown in FIG. 2, first of all, it is determined whether or not an execution flag for commencing the neutral coasting control is "0" (at step S1). Specifically, the neutral coasting control is commenced if the execution flag is set to "1", and terminated if the execution flag is set to "0". That is, the execution flag is set to "0" in the beginning of the control shown in FIG. 2.

Figure 3:
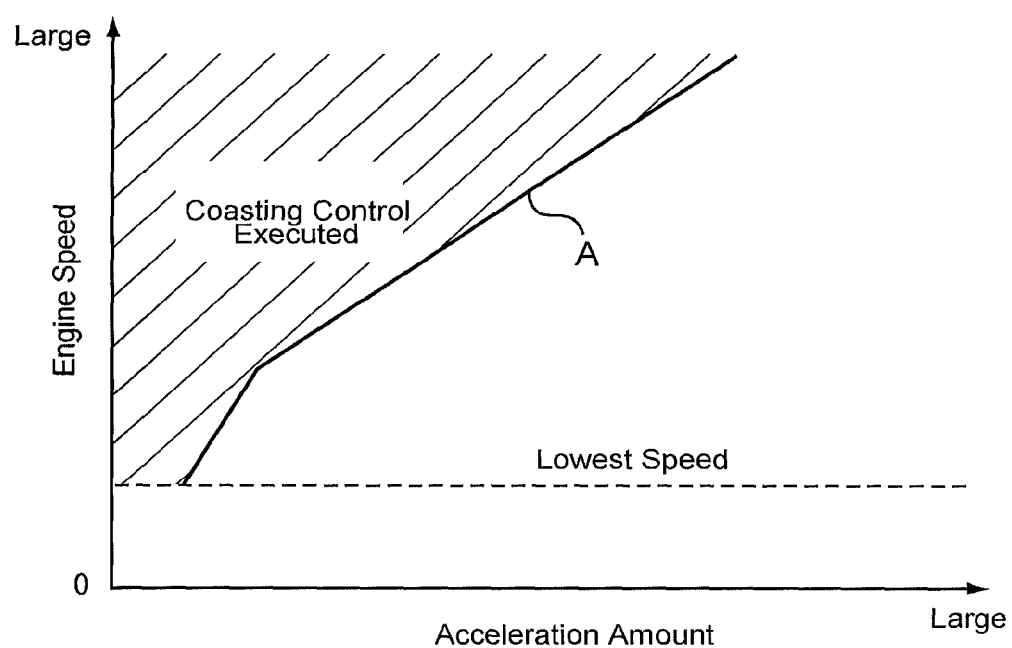
FIG. 3 shows one example of a map used in the neutral coasting control according to the present invention.

If the execution flag is "0" so that the answer of step S1 is YES, the routine advances to step S2 to determine whether or not the accelerator is "OFF", that is, to determine whether or not an operating amount of the accelerator is zero or smaller than a predetermined operating amount. According to the present invention, the coasting control is triggered by the fact that the operating amount of the accelerator is reduced to zero or to be smaller than the predetermined amount, in addition to a satisfaction of all of the above-explained preconditions for commencing the coasting control. Specifically, the fact that the operating amount of the accelerator is reduced to zero or to be smaller than a predetermined value is a condition to determine whether or not the accelerator pedal depressed by the driver is released and returned. The reference value of the operating amount of the accelerator used to determine to execute the coasting control is not necessarily to be zero. For example, as indicated in the map shown in FIG. 3, the neutral coasting control is commenced when the operating amount of the accelerator is reduced to be smaller than a reference value A. Optionally, as shown in FIG. 3, the reference value A may be altered in accordance with the engine speed Ne.

If the accelerator is "OFF", that is, if the operating amount of the accelerator is smaller than the reference value so that the answer of step S2 is YES, the routine advances to step S3 to determine whether or not a throttle valve of the engine 1 is "OFF", that is, to determine whether or not an opening degree of the throttle valve is at an idling degree $\theta\_a$ at which the engine 1 is operated at an idling speed $Neidl\_a$. Specifically, the idling speed $Neidl\_a$ is lower than a normal speed range of the engine 1 propelling the vehicle Ve while engaging the clutch device 7, and which is the lower limit speed at which the engine 1 operated free from the load under the all-cylinder mode is allowed to rotate autonomously.

If the throttle valve is "OFF", that is, if the opening degree of the throttle valve is at the idling degree $\theta\_a$ so that the answer of step S3 is YES, the execution flag is set to "1" at step S4 to carry out the neutral coasting control. Then, the clutch device 7 is brought into disengagement as indicated "OFF" in FIG. 2 (at step S5).

Thereafter, a shifting target speed Necut is calculated (at step S6). The shifting target speed Necut is a criterion for shifting the operation mode of the engine 1 from the all-cylinder mode to the cylinder deactivation mode under the neutral coasting control. To this end, the shifting target speed Necut is set to an intermediate value between the current engine speed Ne and the idling speed $Neidl\_a$ under the all-cylinder mode. Specifically, the shifting target speed Necut can be expressed by the following expression:

$$Necut=(Ne+Neidl\_a)/2.$$

After thus calculating the shifting target speed Necut at step S6, it is determined whether or not the execution flag for carrying out the neutral coasting control is "1" (at step S7). If the execution flag is not "1" so that the answer of step S7 is NO, the routine is returned without carrying out any specific control.

By contrast, if the execution flag is "1" so that the answer of step S7 is YES, the routine advances to step S8 to determine whether or not the current engine speed Ne has been lowered to be lower than the shifting target speed Necut.

If the current engine speed Ne has not yet been lowered to be lower than the shifting target speed Necut so that the answer of step S8 is NO, the routine is returned without carrying out any specific control.

By contrast, if the current engine speed Ne has been lowered to be lower than the shifting target speed Necut so that the answer of step S8 is YES, the routine advances to step S9 to shift the operation mode of the engine 1 from the all-cylinder mode to the cylinder deactivation mode.

Then, an opening degree of the throttle valve is adjusted to be adapted to the cylinder deactivation mode (at step S10). Specifically, an idling degree θ_b at which the engine 1 is operated at an idling speed Neidl_b is sent to the throttle valve in the form of command signal.

Specifically, the idling speed Neidl_b is lower than the normal speed range of the engine 1 under the normal running condition, at which the engine 1 operated free from the load under the cylinder deactivation mode is allowed to rotate autonomously. In addition, the idling speed Neidl_b for the cylinder deactivation mode is adjusted to be higher than the idling speed Neidl_a for the all-cylinder mode. Under the cylinder deactivation mode, number of activated cylinder is reduced in comparison with that under the all-cylinder mode. Consequently, vibrations of the engine 1 are amplified under the cylinder deactivation mode, and such vibrations are increased with a reduction in the engine speed especially at the lower limit speed. For this reason, the idling speed Neidl_b for the cylinder deactivation mode is set to be higher than the idling speed Neidl_a for the all-cylinder mode.

After thus reducing the speed of the engine 1 to the idling speed Neidl_b, the routine is returned.

To the contrary, if the execution flag is not "0" so that the answer of step S1 is NO, the routine advances to step S7 while skipping steps S2 to S6 to execute the above-explained determination.

Likewise, if the accelerator is not "OFF", that is, if the operating amount of the accelerator is larger than the reference value so that the answer of step S2 is NO, the routine advances to step S7 while skipping steps S3 to S6. Also, if the throttle valve is not "OFF", that is, if the opening degree of the throttle valve has not yet been reduced to the idling degree θ_a so that the answer of step S3 is NO, the routine advances to step S7 while skipping steps S4 to S6. In cases the answer of any of steps S2 and S3 is NO, the execution flag for carrying out the neutral coasting control is still set to "0" so that the answer of step S7 will be NO. Therefore, the routine is returned without carrying out any specific control.

Thus, according to the present invention, the engine 1 is idled while deactivating some of the cylinders during the neutral coasting. Therefore, fuel consumption during the neutral coasting control can be reduced so that fuel economy of the vehicle Ve can be improved. As also described, the operation mode of the engine 1 is shifted at step S8 from the all-cylinder mode to the cylinder deactivation mode after reducing the engine speed Ne to be lower than the shifting target speed Necut. Specifically, the cylinder deactivation mode is commenced after reducing the engine speed Ne to the idling speed Neidl_b for the cylinder deactivation mode. That is, the operation mode of the engine 1 is shifted from the all-cylinder mode to the cylinder deactivation mode while reducing a speed difference between the current engine speed Ne and the idling speed Neidl_b of the cylinder deactivation mode. For this reason, the operation mode of the engine 1 can be shifted smoothly from the all-cylinder mode to the cylinder deactivation mode.

As described, the control system of the present invention is configured to shift the operation mode of the engine 1 from the all-cylinder mode to the cylinder deactivation mode while setting the shifting target speed Necut. Alternatively, the operation mode of the engine 1 may also be shifted to the cylinder deactivation mode after a lapse of predetermined period of time determined taking account of a timing to engage the clutch device 7 and a timing to lower the engine speed Ne. An example of such control will be explained with reference to the time chart shown in FIG. 4. In the example shown in FIG. 4, the accelerator that has been depressed at predetermined degree to propel the vehicle Ve is returned to the "OFF" position at a point t1. Consequently, an opening degree of the throttle valve of the engine 1 is reduced to the idling degree θ_a. In this situation, the engine 1 is still operated under the all-cylinder mode, therefore, the opening degree of the throttle valve is reduced to the idling degree θ_a to rotate the engine 1 at the idling speed Neidl_a of the all-cylinder mode. As a result, the engine speed Ne starts lowering toward the idling speed Neidl_a.

At point t1, in addition, a command to bring the clutch device 7 into disengagement is outputted. That is, since the accelerator is turned off during running, a command signal for carrying out the neutral coasting control is outputted. Then, when the clutch device 7 is brought into disengagement, the power transmission route between the engine 1 and the drive wheels 2 is cut-off and the neutral coasting is commenced.

However, completion of disengagement of the clutch device 7 is inevitably delayed behind a reception of the disengaging command. If the operation mode of the engine 1 is shifted from the all-cylinder mode to the cylinder deactivation mode before completion of disengagement of the clutch device 7, torque pulses and vibrations resulting from the shifting of the operation mode would propagate to the drive wheels 2. In this case, the driver may feel shocks and uncomfortable feeling.

Figure 4:
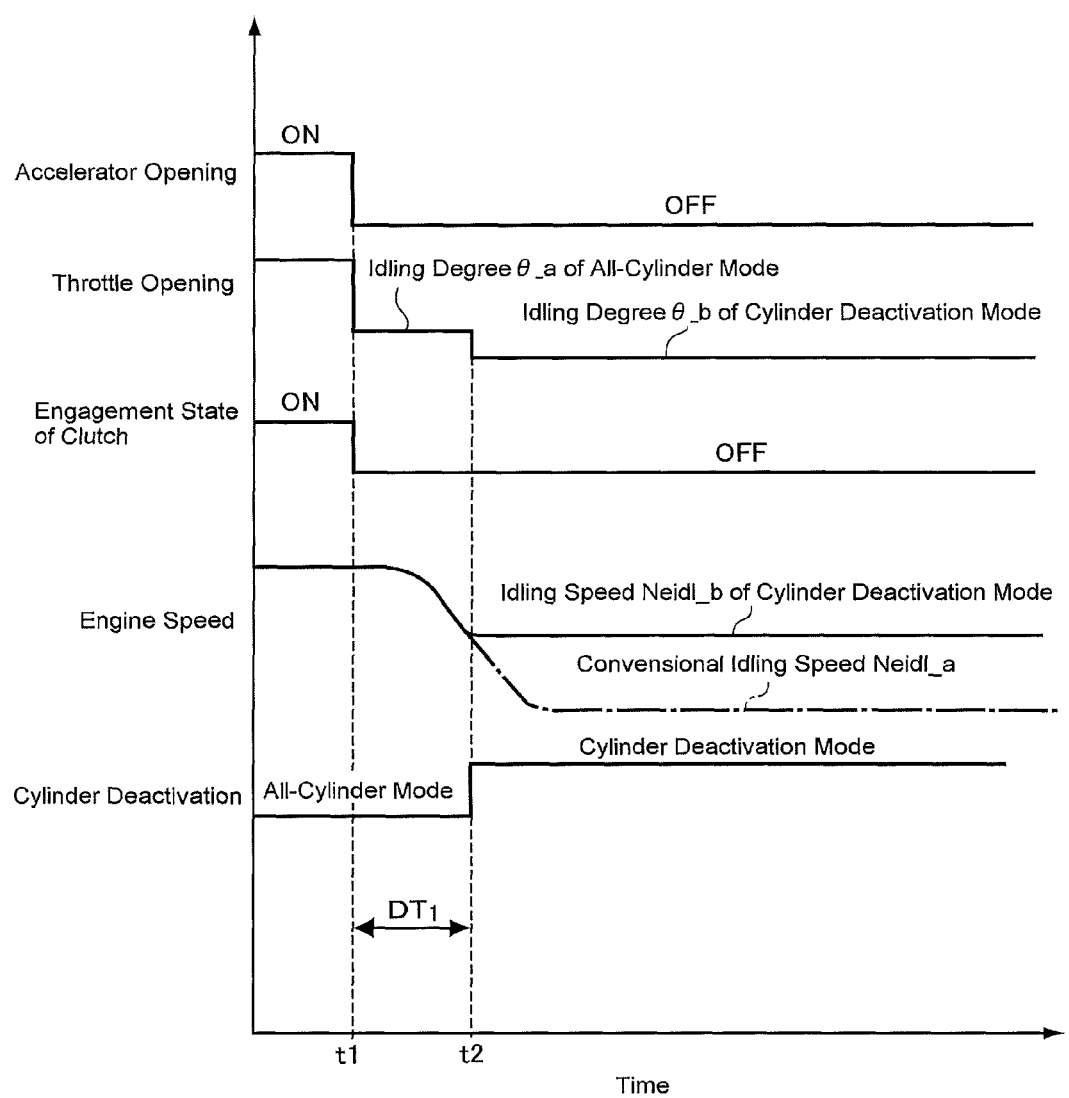
FIG. 4 is a time chart indicating temporal changes in a throttle opening, an engagement state of the clutch, and an operating condition of the engine during another example of the neutral coasting control of the present invention.

In order to prevent such vibrations, according to the example shown in FIG. 4, a predetermined delay time to commence the cylinder deactivation mode is set taking account of such response delay of the clutch device 7. In the example shown in FIG. 4, specifically, the delay time DT1 is set from point t1 to point t2. That is, the delay time DT1 starts at point t1 and the command for executing the cylinder deactivation of the engine 1 is outputted at point t2 when the delay time DT1 has elapsed. As described, the delay time DT1 is waiting time for shifting the operation mode of the engine 1 from the all-cylinder mode to the cylinder deactivation mode. To this end, the delay time DT1 may be determined based on a simulation result or an experiment. Thus, the command signal for executing the cylinder deactivation of the engine 1 is outputted at point t2, and the operation mode of the engine 1 is shifted from the all-cylinder mode to the cylinder deactivation mode.

At point t2, in addition, an opening degree of the throttle valve is reduced to the idling degree θ_b at which the engine 1 is operated at the idling speed Neidl_b. Under the cylinder deactivation mode of the engine 1, a friction torque of the engine 1 is reduced with a reduction in number of activated cylinders. That is, the engine speed Ne is increased as a result of shifting from the all-cylinder mode to the cylinder deactivation mode given that the opening degree of the throttle is not changed. As described, under the cylinder deactivation mode, vibrations of the engine 1 will be amplified during idling in comparison with the all-cylinder mode. Therefore, in order to reduce the vibrations of the engine 1 under the cylinder deactivation mode, the idling speed Neidl_b for the cylinder deactivation mode is set to be slightly higher than the idling speed Neidl_a for the all-cylinder mode. In addition, the idling degree θ_b at which the engine 1 is operated at the idling speed Neidl_b is determined taking account of all of those factors. According to the example shown in FIG. 4, the idling degree θ_b for the cylinder deactivation mode is set to be slightly narrower than the idling degree θ_a for the all-cylinder mode.

As described, the idling speed Neidl_b for the cylinder deactivation mode is set to be slightly higher than the idling speed Neidl_a for the all-cylinder mode. Therefore, as a result of reducing the opening degree of the throttle valve from the idling degree θ_a to the idling degree θ_b, the engine speed Ne lowering toward the idling speed Neidl_a for the all-cylinder mode is maintained at the idling speed Neidl_b for the cylinder deactivation mode.

Thus, according to the control example shown in FIG. 4, the operation mode of the engine 1 can be shifted from the all-cylinder mode to the cylinder deactivation mode after a lapse of the delay time DT1 for waiting completion of disengagement of the clutch device 7. In other words, the cylinder deactivation mode of the engine 1 can be commenced after a lapse of the predetermined period of time from the point at which the clutch device 7 is completely disengaged. For this reason, the operation mode can be shifted smoothly to the cylinder deactivation mode without causing shocks and vibrations.

Thus, according to the control example shown in FIG. 4, the timing to commence the cylinder deactivation of the engine 1 is determined taking into consideration response delay of the clutch device 7. Alternatively, the timing to commence the cylinder deactivation of the engine 1 may also be determined taking account of response delay of speed control of the engine 1. An example of such control will be explained with reference to the time chart shown in FIG. 5. In the example shown in FIG. 5, the accelerator that has been depressed at predetermined degree to propel the vehicle Ve is returned to the "OFF" position at a point t11. Consequently, an opening degree of the throttle valve of the engine 1 is reduced to an idling degree θ_c. In this situation, the engine 1 is still operated under the all-cylinder mode. The idling degree θ_c is set to be slightly wider than the idling degree θ_a to rotate the engine 1 at the idling speed Neidl_a of the all-cylinder mode. Specifically, the idling degree θ_c is set to a value possible to operate the engine 1 at a same speed as the idling speed Neidl_b for the cylinder deactivation mode. As a result, the engine speed Ne starts lowering toward the idling speed Neidl_c.

At point t11, in addition, a command to bring the clutch device 7 into disengagement is outputted. That is, since the accelerator is turned off during running, the command signal for carrying out the neutral coasting control is outputted. Then, when the clutch device 7 is brought into disengagement, the power transmission route between the engine 1 and the drive wheels 2 is cut-off and the neutral coasting is commenced.

However, reduction in the engine speed Ne is inevitably delayed behind a reception of a speed reduction command. If the operation mode of the engine 1 is shifted from the all-cylinder mode to the cylinder deactivation mode before the engine speed Ne is lowered to a desired speed, the operation mode cannot be shifted smoothly.

Figure 5:
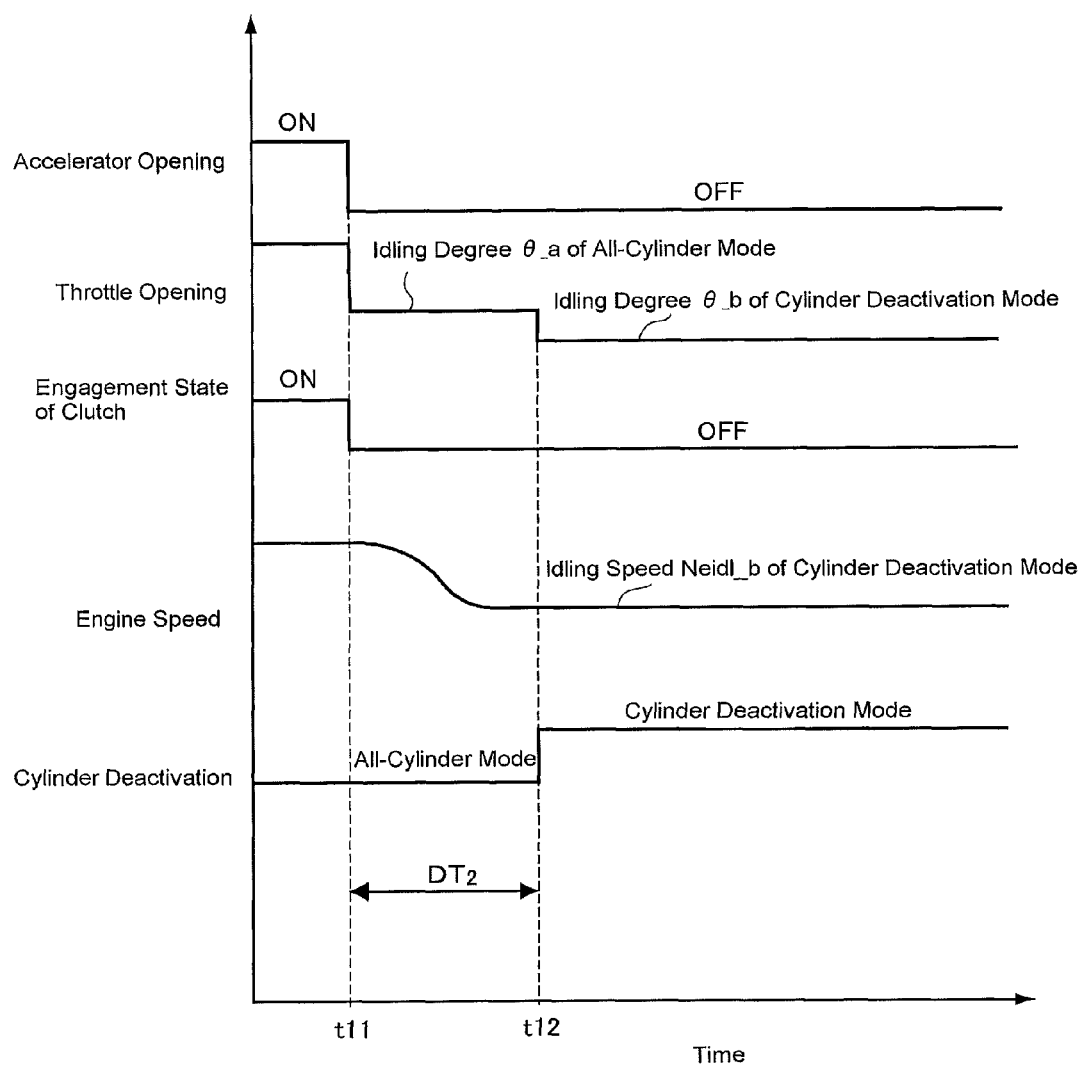
FIG. 5 is a time chart indicating temporal changes in a throttle opening, an engagement state of the clutch, and an operating condition of the engine during still another example of the neutral coasting control of the present invention.

In order to smoothly shift the operating mode of the engine 1, according to the example shown in FIG. 5, a predetermined delay time to commence the cylinder deactivation mode is set taking account of such delay in reduction of the engine speed Ne. In the example shown in FIG. 5, specifically, the delay time DT2 is set from point t11 to point t12. That is, the delay time DT2 starts at point t11 and the command for executing the cylinder deactivation of the engine 1 is outputted at point t12 when the delay time DT2 has elapsed. Thus, the delay time DT2 is the waiting time to commence the shifting of operation mode of the engine 1 from the all-cylinder mode to the cylinder deactivation mode after the engine speed Ne is lowered to the idling speed Neidl_c and stabilized. To this end, the delay time DT2 may be determined based on a simulation result or an experiment.

Thus, at point t12, the command signal for executing the cylinder deactivation of the engine 1 is outputted, and the opening degree of the throttle valve is reduced to the idling degree θ_b at which the engine 1 is operated at the idling speed Neidle_b. Consequently, the operation mode of the engine 1 is shifted from the all-cylinder mode to the cylinder deactivation mode.

As described, according to the example shown in FIG. 5, the engine 1 is shifted from the all-cylinder mode to the cylinder deactivation mode after a lapse of the delay time DT2 determined taking account of response delay of the engine speed Ne. That is, the operation mode of the engine 1 is allowed to be shifted to the cylinder deactivation mode after the engine speed Ne is lowered to the idling speed Neidl_b and stabilized. Therefore, the operation mode of the engine 1 can be shifted smoothly to the cylinder deactivation mode without causing shocks and vibrations.

Thus, according to the present invention, the engine 1 is idled and the clutch device 7 is brought into disengagement to cut-off the power transmission route between the engine 1 and the drive wheels 2 to coast the vehicle Ve upon deactivation of the accelerator during running. Therefore, a cruising distance of the vehicle Ve without load can be extended so that the fuel economy can be improved.

In addition, according to the present invention, the cylinder deactivation of the idling engine 1 is executed during the neutral coasting to reduce number of combusting cylinders. Therefore, fuel consumption during the neutral coasting can be reduced in comparison with the conventional coasting control activating all cylinders. Thus, the fuel economy can be further improved during the neutral coasting control.

Here will be briefly explained a relation between the foregoing examples and the present invention. The functional means of step S5 serves as the execution means of the invention, and the functional means of step S6 to S10 serve as the engine control means of the invention.

The invention claimed is:

1. A vehicle control system, that is applied to a vehicle comprising an engine having a plurality of cylinders, a power transmission route between the engine and drive wheels and a clutch device adapted to selectively connect and disconnect the power transmission route, and that is configured to disconnect the power transmission route during running to allow the vehicle to coast, comprising a controller that is configured to:
    detect a vehicle speed;
    detect an operation of an accelerator by a driver;
    detect a speed of the engine;
    execute a coasting control when an operating amount of an accelerator is reduced to be smaller than a predetermined value during running, by bringing the clutch device into disengagement to disconnect the power transmission route; and
    reduce number of combusting cylinders during the coasting control while reducing the engine speed to an idling speed that is lower than that of a case in which the coasting control is not carried out.

2. The vehicle control system as claimed in claim 1, wherein the controller is further configured to adjust the idling speed to be higher than a lower limit speed at which the engine operated under all-cylinder mode is allowed to rotate autonomously.

3. The vehicle control system as claimed in claim 2, wherein the controller is further configured to reduce number of combusting cylinders after a lapse of a predetermined period of time from a point at which the clutch device is brought into disengagement.

4. The vehicle control system as claimed in claim 1, wherein the controller is further configured to reduce number of combusting cylinders after a lapse of a predetermined period of time from a point at which the clutch device is brought into disengagement.

* * * * *